United States Patent
Blackburn et al.

[19]

[11] Patent Number: 6,157,372
[45] Date of Patent: Dec. 5, 2000

[54] METHOD AND APPARATUS FOR CONTROLLING A PLURALITY OF CONTROLLABLE DEVICES

[75] Inventors: Brian K. Blackburn, Rochester Hills; Scott B. Gentry, Romeo, both of Mich.; William R. Swihart, Torrance, Calif.

[73] Assignee: TRW Inc., Lyndhurst, Ohio

[21] Appl. No.: 08/921,938

[22] Filed: Aug. 27, 1997

[51] Int. Cl.[7] ...................................................... G09G 5/00
[52] U.S. Cl. ........................... 345/173; 345/157; 382/187
[58] Field of Search ................... 345/173, 174, 345/157, 199; 382/185–189

[56] References Cited

U.S. PATENT DOCUMENTS

| | | |
|---|---|---|
| 4,550,221 | 10/1985 | Mabusth . |
| 4,725,694 | 2/1988 | Auer et al. . |
| 4,899,138 | 2/1990 | Araki et al. ............................. 340/706 |
| 4,953,226 | 8/1990 | Matsuyama ............................. 382/13 |
| 5,428,805 | 6/1995 | Morgan ................................... 345/173 |
| 5,432,304 | 7/1995 | Tanahashi . |
| 5,451,724 | 9/1995 | Nakazawa et al. . |
| 5,465,103 | 11/1995 | Yoshioka . |
| 5,798,758 | 8/1998 | Harada et al. ........................... 345/349 |
| 5,861,886 | 1/1999 | Moran et al. ............................ 345/179 |
| 5,864,105 | 1/1999 | Andrews .................................... 200/5 |
| 5,903,229 | 5/1999 | Kishi ....................................... 345/173 |

OTHER PUBLICATIONS

U.S. Patent Application Serial No. 08/777,753 to Andrews filed Dec. 30, 1996, for Method and Apparatus for Controlling An Adjustable Device (copy not enclosed).

*Primary Examiner*—Steven J. Saras
*Assistant Examiner*—Tewolde Mengisteab
*Attorney, Agent, or Firm*—Tarolli, Sundheim, Covell, Tummino & Szabo L.L.P.

[57] ABSTRACT

An apparatus (10) and a method for controlling a plurality of controllable devices (14, 16, 18 and 20). Preferably, the devices (14, 16, 18 and 20) are located within a vehicle. A touch pad (46) of the apparatus (10) has an array of manually touchable areas (48) and provides signals indicative of manual touches to the areas (48). The array of manually touchable areas (48) are arranged such that various swiping and non-swiping manual touch patterns to the array can be accomplished. The touch patterns include touch patterns which correspond to controllable aspects of the devices (14, 16, 18 and 20). The apparatus (10) includes a control module (52). A receiver function (60) of the control module (52) receives the signals provided by the touch pad (46). An interpreter function (64) of the control module (52) interprets information contained within the received signals to identify touch patterns to the touch pad (46). A communication function (66) of the control module (52) provides control signals to control the controllable aspects of the devices (14, 16, 18 and 20) in response to the identified touch patterns.

4 Claims, 6 Drawing Sheets

METHOD AND APPARATUS FOR CONTROLLING A PLURALITY OF CONTROLLABLE DEVICES

TECHNICAL FIELD

The present invention is generally directed to a method and apparatus for controlling a plurality of controllable devices and is particularly directed to systems in which manual inputs from a vehicle occupant are used to control controllable aspects of devices located within a vehicle.

BACKGROUND OF THE INVENTION

Within a vehicle there are several controllable devices which can be controlled in response to input from a vehicle occupant. Examples of such controllable devices include a power vehicle seat, a power window, a radio, and a heating, ventilating and cooling (HVAC) system, Each of these controllable devices has a plurality of controllable aspects. For example, a typical power seat has adjustment motors (e.g., stepper motors) for moving the seat fore/aft, tilting the seat, and varying the seat lumbar support.

Within the vehicle, each of the controllable devices is associated with one or more controller mechanisms or interfaces which are manually actuated by the vehicle occupant to control the controllable device. For example, the typical power seat control interface includes numerous, separate, manually actuatable switches for controlling the adjustment motors. These switches are mounted either on the side of the seat or on an arm rest adjacent to the seat.

As the sophistication of vehicles has increased, the number of controllable devices has increased and the complexity of each controllable device has increased. Associated with this increase in number and complexity of controllable devices, the number and complexity of the associated controller interfaces has increased.

SUMMARY OF THE INVENTION

The present invention provides an apparatus and a method for controlling a plurality of controllable devices. A touch pad means of the apparatus has an array of manually touchable areas for providing signals indicative of manual touches to the areas. The array of manually touchable areas is arranged such that various swiping and non-swiping manual touch patterns to the array can be accomplished. The touch patterns include touch patterns which correspond to controllable aspects of the devices.

Receiver means of the apparatus receives the signals provided by the touch pad means. Interpreter means interprets information contained within the received signals to identify touch patterns to the touch pad means. Signal means provides control signals to control the controllable aspects of the devices in response to the identified touch patterns.

The method includes providing touch pad means having an array of manually touchable areas arranged such that various swiping and non-swiping manual touch patterns to the array can be accomplished. The touch patterns include touch patterns which correspond to controllable aspects of the devices. Signals are sent from the touch pad means which are indicative of manual touches to the areas of the array. The signals sent from the touch pad means are received. Information contained within the received signals is interpreted to identify touch patterns to the touch pad means. Control signals are generated to control the controllable aspects of the devices in response to the identified touch patterns.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS

Figure 1:
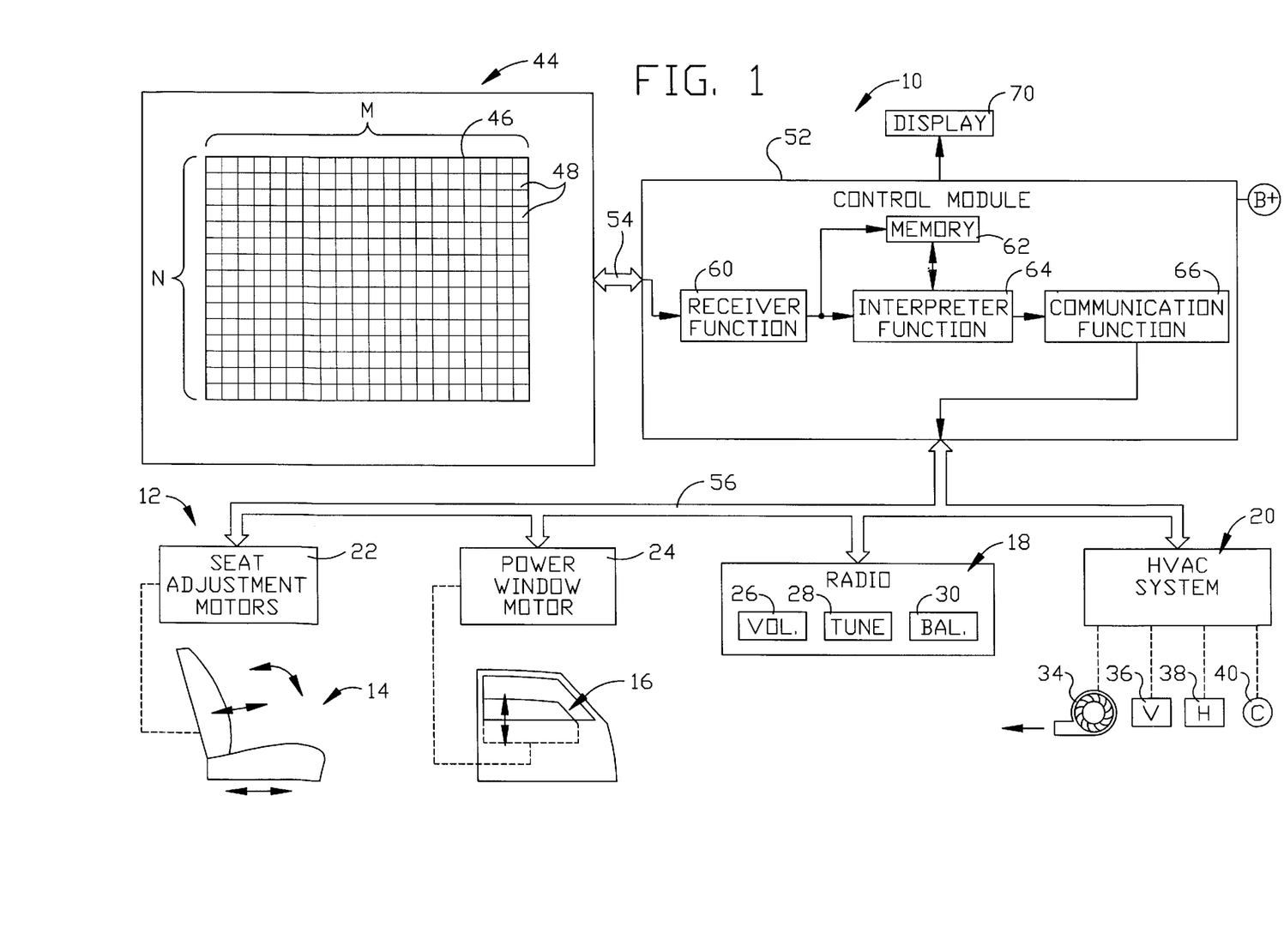
FIG. 1 is a schematic illustration of a plurality of controllable devices and an apparatus for controlling the devices in accordance with the present invention.

One representation of the present invention is schematically shown in FIG. 1 as an apparatus 10 for controlling controllable devices 12, which are: a power seat 14, a power window 16, a radio 18, and a heating, ventilating, and air conditioning (HVAC) system 20, all within a vehicle (not shown). It will be appreciated that, although the disclosed example representation of the present invention is directed to control of the four identified controllable vehicle devices 12, the present invention is applicable to control of a different number of vehicle devices and/or a different group of vehicle devices. Also, it will be appreciated that, although the representation of the present invention is directed to control of vehicle devices, the present invention is equally applicable to control of non-vehicle devices.

The power seat 14 has a plurality of seat adjustment motors 22 associated with several adjustable aspects of the power seat. The connections between the motors 22 and the appropriate portions of the power seat 14 are represented by a dash line in FIG. 1. In the example shown in FIG. 1, the power seat 14 is movable in the fore/aft direction, the seat is tiltable, and a lumbar support of the seat is variable. These adjustable aspects of the power seat 14 are represented by arrowheads in FIG. 1.

The power window 16 of the example shown in FIG. 1 can be raised or lowered (represented by arrowheads) to any position between a fully closed position and a fully opened position by a power window motor 24 (connection represented by a dash line). Further, the power window motor 24 can be operated in an "auto-down" or "auto-up" mode such that the window 16 is automatically moved to a completely open position or a completely closed position, respectively.

The radio 18 of the example has three controllable aspects: volume control 26, tuning control 28, and speaker balance control 30. The HVAC system 20 of the example includes a variable speed blower 34, a ventilation direction and baffling system 36, a heater core exchange system 38, and an air conditioning system 40. Of course, it will be appreciated that the controllable devices 12 may have different controllable aspects and/or a different number of controllable aspects.

Control of all of the several controllable devices 12 is accomplished via manually touching by a vehicle occupant (not shown) on a tactile operator 44 of the apparatus 10. The tactile operator 44 may be mounted at any suitable location within the vehicle. For example, the tactile operator 44 may be mounted on an instrument panel (not shown) of the vehicle or the tactile operator may be mounted on a hub of a steering wheel (not shown) of the vehicle.

The tactile operator 44 has a touch pad 46 with a M by N array of discrete, manually touchable areas 48. Specifically, the touch pad 46 has M columns of touchable areas 48 extending along a X abscissa and has N rows of touchable areas extending along an orthogognal Y ordinate. Accordingly, the touch pad 46 has M×N touchable areas 48.

Various touch patterns can be performed on the touch pad 46. The touch patterns include swiping (i.e., dragging a finger across a sequence of touchable areas 48) and non-swiping touches. Also, the touch patterns include more complex patterns, such as swiping alpha-numeric characters and touch patterns which include time duration components (e.g., a series of finger taps).

The touch pad 46 may be of any suitable construction which provides electrical signals indicative of the particular touchable areas 48 which are manually touched. For example, the touch pad 46 may include first and second arrays of conductive plates and an insulating layer which overlies the first and second arrays. The plates of one array are aligned in a plurality of columns and the plates of the second array are aligned in a plurality of rows. When the vehicle occupant manually touches the outer surface of the insulating layer at a particular area, a change in capacitance occurs in one of the columns of plates in the first array (i.e., a X coordinate) and in one of the rows of plates in the second array (i.e., a Y coordinate). Each pair of plates, one column plate and one row plate, corresponds to a distinct one of the touchable areas 48. The signals provided by the touch pad 46 are indicative of which pairs of plates have a changed capacitance. Thus, the signals are indicative of which areas are manually touched.

Another suitable construction of the touch pad 46 may include a resistor layer, an insulating spacer layer, and a conductor layer. The spacer layer is made up of a plurality of spacer pieces which are arranged so that electrical contact is made between the conductor layer and the resistor layer when a pressure is applied to a point on the conductor layer. As a result of the pressure, electrical current flows through a distinct pair of grid contacts. Signals are provided by the touch pad 46 which are indicative of the manual touchable areas at the location of the point of pressure application (i.e., X and Y coordinates).

The apparatus includes a control module 52 which controls the controllable devices 12 (i.e., the power seat, etc.) in response to manual touches to the touch pad 46. The control module 52 is powered by a suitable energy source B+ (e.g., the battery of the vehicle) through a suitable voltage regulator. Connection lines 54 connect the control module 52 to the touch pad 46. The control module 52 provides electrical energy to energize the touch pad 46, via the lines 54. The touch pad 46 provides the electrical signals, which indicate manual touches, to the control module 52, via the lines 54. In one example, the electrical signals from the touch pad 46 are analog signals.

A communication bus 56 connects the control module 52 to the controllable devices 12. Each of the controllable devices 12 receives command instruction signals from the control module 52 on the communication bus 56. The controllable devices 12 send information signals back to the control module 52 on the communication bus 56. It will be appreciated that any suitable communication format and protocol can be used for the communication bus 56 (e.g., the devices may have addresses and may be accessed by their addresses). Also, it will be appreciated that another type of communication link between the control module 52 and the controllable devices 12 can be used.

The control module 52 includes a receiver function 60 for receiving the electrical signals from the touch pad 46 and converting the received signals into digital signals. The signals from the touch pad 46 contain information indicative of the present state (i.e., touched or not touched) of each of the touchable areas 48. In one example, the receiver function 60 scans the electrical signals from the touch pad 46 at a preselected frequency to create the digital signals. The receiver function 60 provides the digital signals to a buffer portion of a memory 62, and to an interpreter function 64 of the control module 52.

The interpreter function 64 includes data processing capabilities, and, in the preferred embodiment, the interpreter function 64 is a microcomputer located within the control module 52. The interpreter function 64 processes the information contained within the digital signals from the receiver function 60 and determines the manual touch pattern which has been performed on the touch pad 46. The determination of the manual touch pattern includes recognition of the more complex touch patterns (e.g., alpha-numeric characters) based upon information about the touch patterns stored in the memory 62. The interpreter function 64 rejects unrecognizable touch patterns (e.g., spurious touches are ignored).

The interpreter function 64 further correlates the recognized manual touch pattern with an identification and/or command instruction which is used to identify and/or control a controllable aspect of one of the controllable devices 12. In the preferred embodiment, the identification/command instructions are stored in a look-up table within the memory 62. The interpreter function 64 provides signals, containing the instructions, to a communication function 66 of the control module 52. The communication function 66 sends signals, containing instructions, to the controllable devices 12 in response to the signals from the interpreter function 64, via the communication bus 56. Upon receipt of a signal from the communication function 66 of the control module 52, the selected controllable device 12 performs the activity specified in the contained instruction.

Accordingly, operation of each of the controllable devices 12 to perform their respective controllable functions is the result of one or more manual touches to the touch pad 46. Any protocol hierarchy for selection and operation of the controllable devices 12 may be used. Specifically, all that is needed is: 1) identification of the device to be controlled and 2) the function to be performed. In the disclosed example, with regard to the first requirement, a distinct identification touch pattern (e.g., swiping the first letter of the name of the desired device) to the touch pad 46 is associated with each of the controllable devices 12, and is used to identify or select the respective device. For the disclosed embodiment, "S" identifies the power seat 14, "W" identifies the power window 16, "R" identifies the radio 18, and "H" identifies the HVAC system 20. Performing one of these distinct identification touch patterns on the touch pad 46 results in the associated controllable device 12 being selected for control at the present time.

With regard to the second requirement, once one of the controllable devices 12 is selected, various touch patterns (e.g., linear swipes and/or non-swiping taps) correspond to the various controllable aspects of the selected device, and performing one of the various touch patterns results in the associated function being performed. Thus, it will be appreciated that the same touch pattern may be use to control aspects of two different controllable devices 12 (the device which is controlled is dependent upon which device was selected for control). Control is thus related to when the particular touch pattern is performed.

A display mechanism 70 is connected to the control module 52 and is observable by the vehicle occupant. The information about the status of the controllable devices 12 is displayed by the display mechanism 70 for viewing by the occupant. Further, the display mechanist 70 displays information regarding which controllable device 12 is currently selected for control and what control instruction is currently being performed in response to touch patterns performed on the touch pad 46. The display mechanism 70 can be part of the tactile operator 44, in conjunction with the touch pad 46. For example, the touch pad 46 may be part of a liquid crystal display screen (a touch screen) which can be manually touched to provide the electrical signals.

Figure 2:
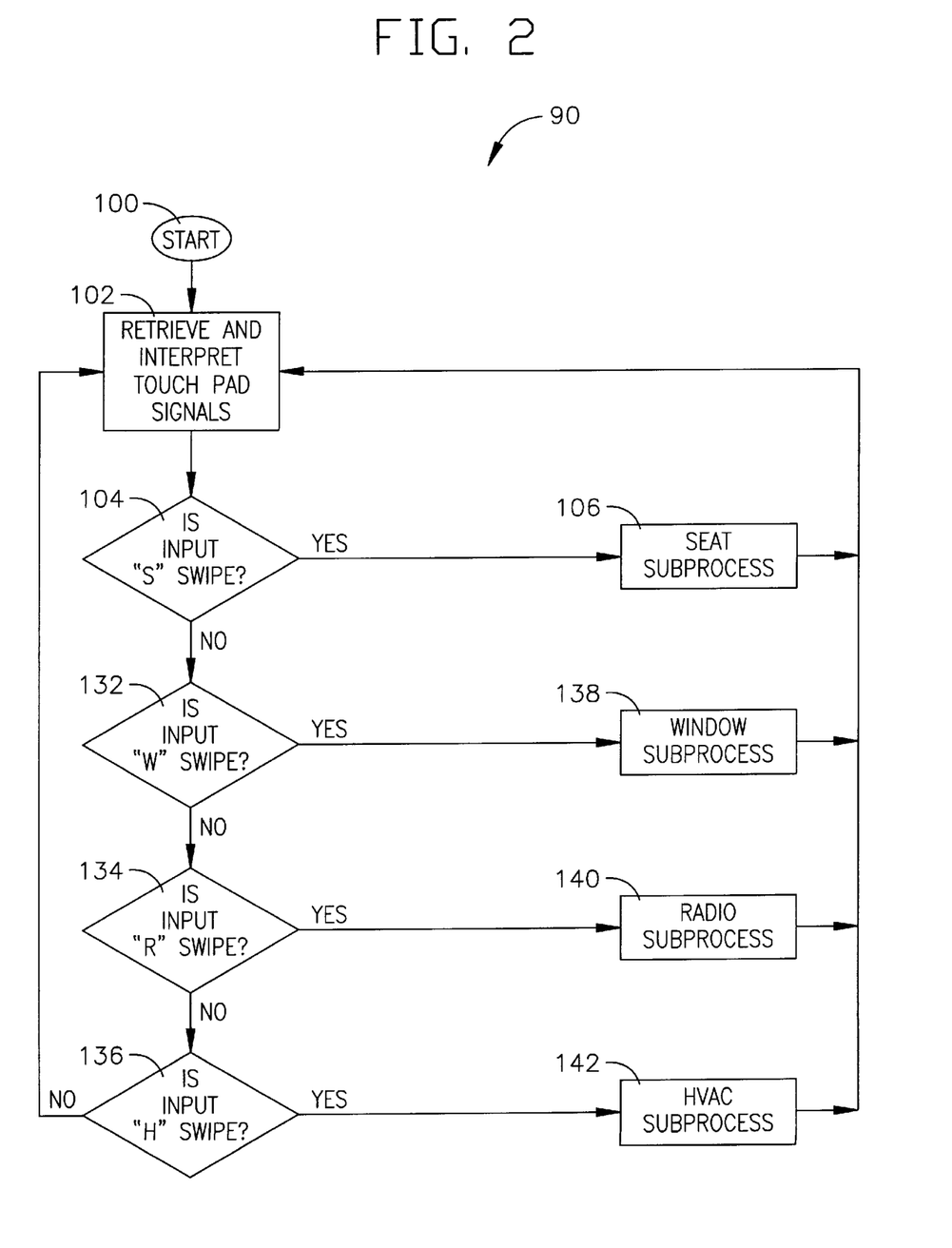
FIG. 2 is a flow chart showing a control process in accordance with the present invention.

Referring to FIG. 2, one example of a control process 90 performed by the interpreter function 64 of the control module 52, in accordance with the present invention, will be appreciated. The process 90 is initiated at step 100 where initial states within the control module 52 are set, e.g., operational flags are cleared, the buffer portion of the memory 62 is cleared, etc. The process 90 then proceeds to step 102.

At step 102, the interpreter function 64 retrieves the digital signals provided by the receiver function 60. As discussed above, the digital signal provided by the receiver function 60 is indicative of manual touches to the touch pad 46. Further, within step 102, the interpreter function 64 determines the identity of the touch pattern which was performed on the touch pad 46. Specifically, the interpreter function 64 determines if the touch pattern is an alpha-numeric character, a linear swipe (either vertical or horizontal), or a non-moving touch. It will be appreciated that time delay and/or retrospective review of information stored within the buffer portion of the memory 62 may be employed by the interpreter function 64 to interpret touch patterns which may be complex, and therefore take a certain amount of time to perform.

Figures 3, 4:
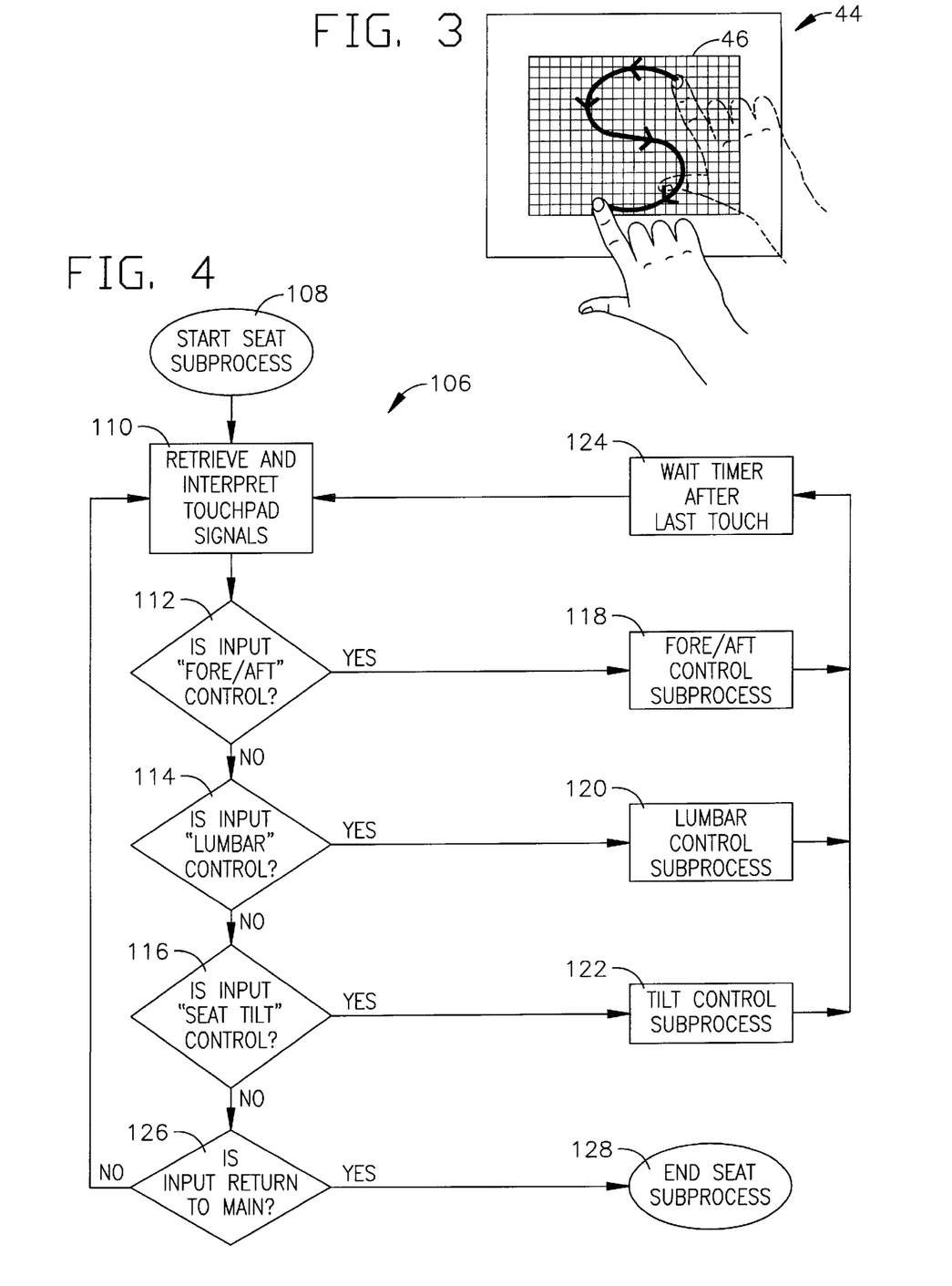
FIG. 3 is an illustration of a touch pad of the device shown in FIG. 1 upon which a manual touch pattern is being performed.
FIGS. 4–7 are flow charts showing portions of the process shown in FIG. 2.

From step 102, the process 90 goes to a sequence of determination steps to select the desired controllable device 12 which is to be controlled. Specifically, at step 104, the interpreter function 64 determines whether the manual input to the touch pad is an S-shaped swipe (FIG. 3 illustrates an example of an S-shaped swipe). An S-shaped swipe, at this point in the process, is a request to control the power seat 14. If the determination at step 104 is affirmative, the process goes to step 106.

Within the step 106 (FIG. 4) is a subprocess which controls the seat adjustment motors 22 (FIG. 1) based upon further inputs to the touch pad 46. The subprocess of step 106 (FIG. 4) is initiated at step 108 and proceeds to step 110. At step 110, the interpreter function 64 again retrieves and interprets the touch patterns performed on the touch pad 46. Again, it will be appreciated that the interpreter function 64 may utilize the buffer portion of the memory 62 and/or retrospective review of information coming from the receiver function 60 regarding identification of the touch patterns.

From the step 110, the subprocess goes to a series of determinations regarding the type of input to the touch pad 46, and thus the type of control which is to be accomplished for the seat adjustment motors 22. Specifically, in the example illustrated in FIG. 4, steps 112–116 are determinations regarding four/aft control, lumbar control, and tilt control, respectfully. The manual touch patterns which are used to indicate four/aft control, lumbar control, and seat tilt control can be any predetermined pattern. All that is required is that information regarding identification of the touch pattern and the command instruction associated with the pattern be programmed into the look-up table of the memory. For example, the touch patterns may be alpha-numeric characters (e.g., the character "T" for seat tilt), linear swiping touch patterns (e.g., a horizontal swipe for four/aft control), or a sequence of non-moving touches (e.g., two taps for lumbar control).

Associated with each of the steps 112–116 are steps 118–122, respectfully. Steps 118–122 are actuation subprocesses for causing the selected controllable device 12 to perform the desired function. It will understood that the subprocess within each of the steps 118–122 includes means for determining and controlling of the direction and amount of movement provided by the appropriate seat adjustment motor 22. For example, in step 118, the requested direction of movement of the seat 14 is determined (e.g., forward in response to a forward swipe on the touch pad 46 and rearward in response to a rearward swipe) and also the requested amount of movement is determined (e.g., corresponding to the duration that the finger is held on the touch pad). The seat 14 is thus moved in the requested direction for the requested distance.

Upon completion of any of the steps 118–122, the process goes to step 124, which is a timing step. Within step 124, the interpreter function 64 waits after the last touch within either of the steps 118–122 before returning to step 110 to again read and interpret touch pad inputs.

If the determination at each of the steps 112–116 is negative for a single pass through the subprocess of step 106, the interpreter function 64 goes to step 126. At step 126, it is determined whether the input to the touch pad 46 is a request to return to the main process 90 (FIG. 2). The input to the touch pad 46 associated with a request to return to the main process 90 can be any predetermined input. For example, the touch pattern input may be alpha-numeric character such as a "M" (for Main process). Alternatively, the input which is interpreted at step 126 as a request to return to the main process 90 can be the lack of manual touch to the touch pad 46 for a predetermined period of time. Specifically, if the touch pad 46 has not been touched, for the predetermined period of time, it can be assumed that the seat 14 is in the desired position and that further control is not desired.

If the determination at step 126 is negative, the subprocess of step 106 jumps to step 110. If the determination at step 126 is affirmative, the subprocess of step 106 goes to step 128, which ends the subprocess. At the end of step 106 (FIG. 2), the process 90 jumps to step 102.

Within the process 90, steps 132–136 are provided for determining whether the desired control is for the power window 16 (step 132), the radio 18 (step 134), or the HVAC system 20 (step 136). The process 90 goes from the step 102 to the sequence of steps 104, 132, 134, and 136, while waiting for a signal indicating a manual touch. If no touch occurs at the touch pad 46, the determination at each of the steps 104 and 132–136 will be negative and, upon a negative determination at the last step (step 136), the process jumps to step 102.

Figure 6:
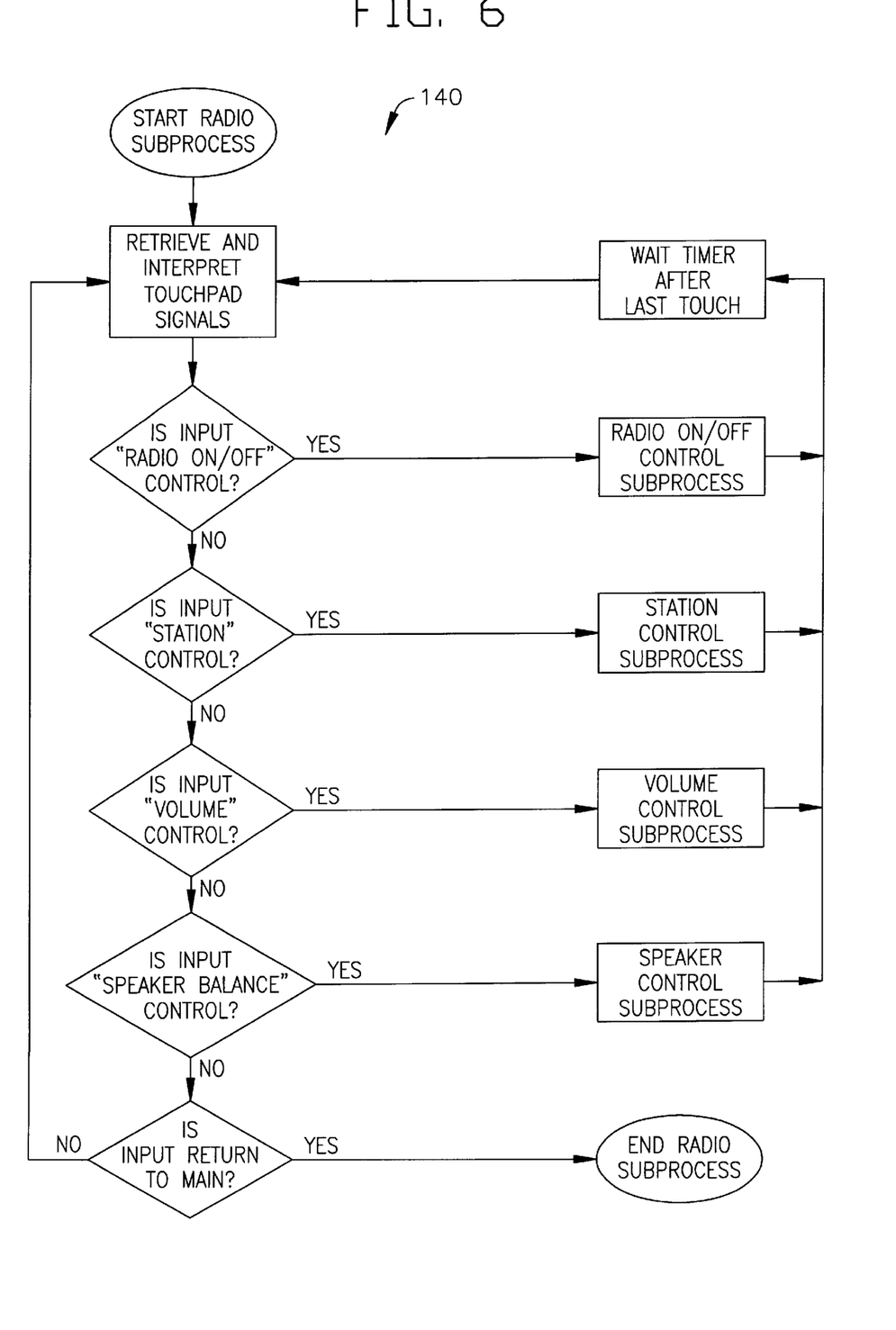
Figure 7:
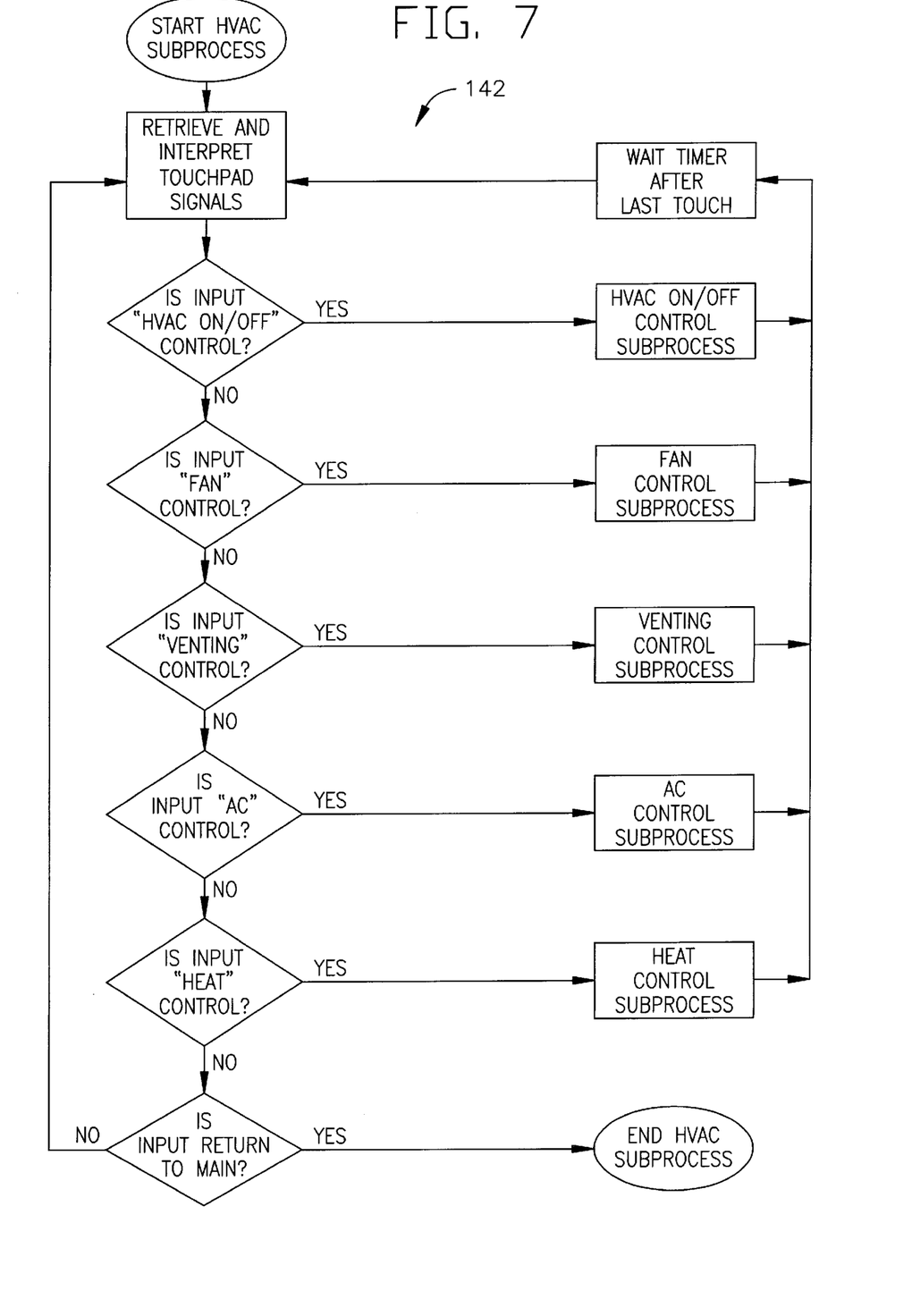

Similar to the association of step 106 with an affirmative determination at step 104, the process 90 has steps 138–142 which are associated with affirmative determinations at steps 132–136, respectfully. The steps 138–142 include subprocesses which are shown in greater detail in FIGS. 5–7, respectfully. Similar to the subprocess of the step 106, each of these subprocess (steps 138–142) proceed through a sequence of retrieving and interpreting touch pad inputs signals, determining which controllable aspect of the respective selected controllable device is to be controlled, and controlling the selected controllable aspect. Again, the touch patterns associated with the controllable aspects may be alpha-numeric characters, swiping touches, or non-swiping touches.

Figure 5:
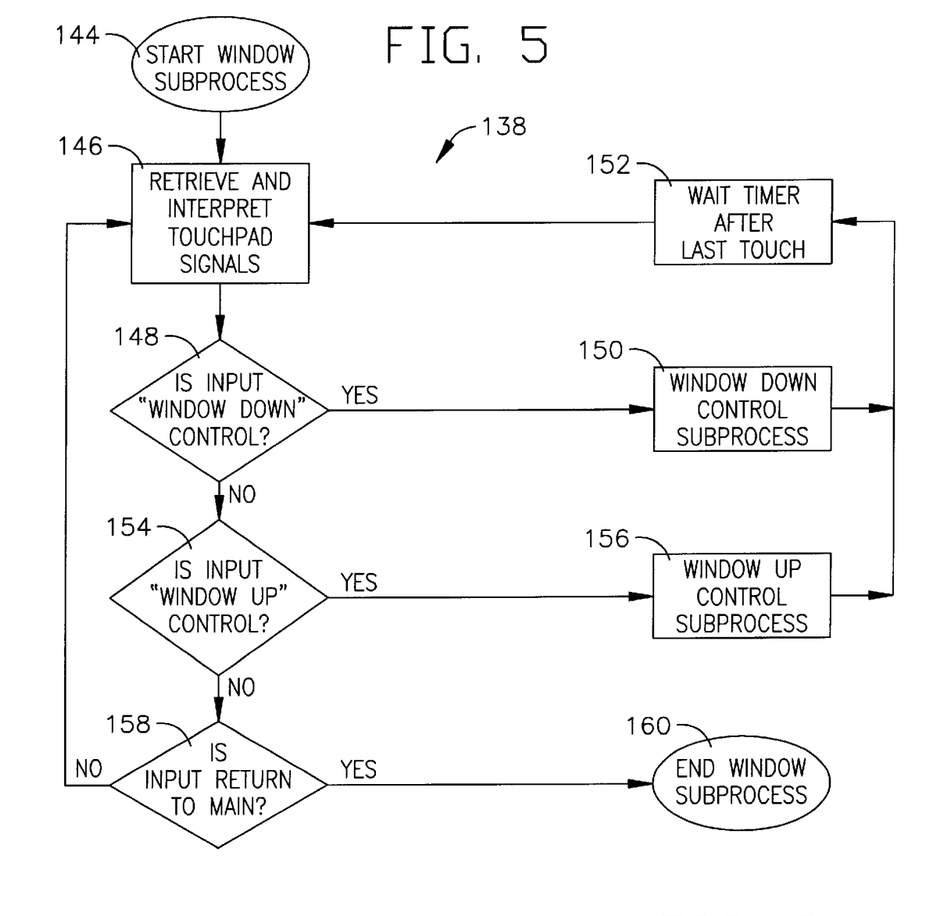

A further example of touch pattern determinations and associated control performed by the interpretation function 64 is present in the subprocess of step 138 (i.e., control of the power window 16 shown in FIG. 5). Within step 138, the subprocess is initiated at step 144 and proceeds to step 146. Recall that it is possible to automatically move the window 16 to a completely opened condition or to a completely closed condition. This automatic movement is requested by a one-touch input on the touch pad 46 at the appropriate time. Thus, if the window 16 is currently in a fully closed position, the interpreter function 64 recognizes two touch patterns to cause the motor 24 to open the window (i.e., the occupant can cause the window to lower to a fully opened position by one of two means).

Figure 8:
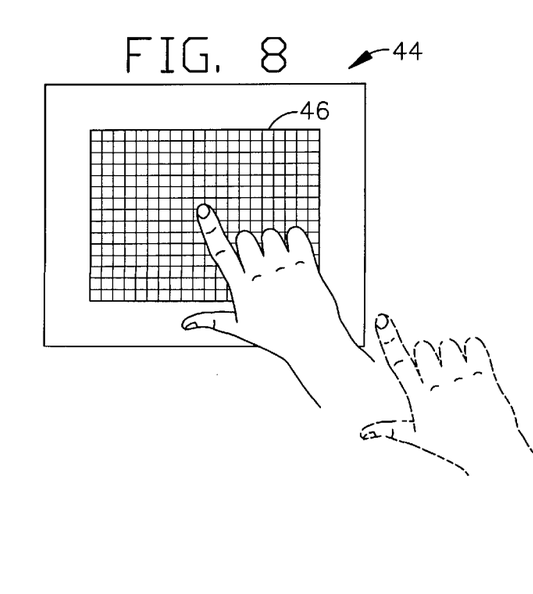
FIGS. 8 and 9 are illustrations of the touch pad, with manual touch patterns being performed.
Figure 9:
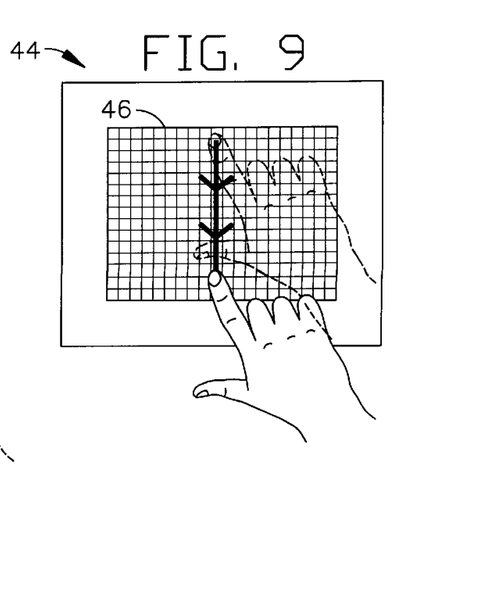

Specifically, within the look-up table within the memory, a single touch (FIG. 8) to the touch pad 46 after the subprocess of step 138 is entered and when the window 16 is in the fully closed position will be interpreted to be a command to operate the power window motor 24 to open the window completely. Also, a vertical swiping motion (FIG. 9) toward the bottom of the touch pad 46 will be interpreted as a request to operate the motor 24 to lower the window 16. If the finger of the occupant is held on the touch pad 46 for a sufficiently long time period at the end of the swipe, the window 16 will be moved to the completely opened position.

Accordingly, with reference to the subprocess of step 138 (FIG. 5,) the subprocess goes from step 146 to step 148, in which the determination is affirmative and the subprocess goes to step 150. At step 150, a subprocess for lowering the power window 16 is performed.

Upon completion of step 150, the subprocess of step 138 proceeds to a step 152 which is similar to the step 124 within the subprocess of step 106 (FIG. 4). The subprocess of step 138 (FIG. 5) also has steps 154 and 156 which are similar to steps 148 and 150, respectively, but the steps 154 and 156 are for upward movement of the window 16. Also, the subprocess of step 138 (FIG. 5) has steps 158 and 160 which are similar to steps 126 and 128 in the subprocess of step 106 (FIG. 4). Step 158 determines if a request to return to the main menu is the input, and, if a return is requested, step 160 ends the subprocess of step 138 and returns to the main process 90 (FIG. 2).

The steps within the subprocesses of steps 140 and 142 (FIGS. 6 and 7) are not described in full detail. However, it will be appreciated that a person of ordinary skill in the art will appreciate the flow of the subprocesses and the control provided by the subprocesses. Further, the control of a plurality of devices, via inputs to the touch pad 46 of the tactile operator, will be appreciated.

From the above description of the invention, those skilled in the art will perceive improvements, changes and modifications. Such improvements, changes and modifications within the skill of the art are intended to be covered by the appended claims.

Having described the invention, we claim the following:

1. An apparatus for controlling a plurality of controllable devices, said apparatus comprising:

touch pad means having an array of manually touchable areas for providing signals indicative of manual touches to the areas, said array of manually touchable areas being arranged such that various swiping and non-swiping manual touch patterns to said array can be accomplished, the touch patterns including touch patterns in the form of alphanumeric characters, the touch patterns including touch patterns that correspond to controllable aspects of the devices;

receiver means for receiving the signals provided by said touch pad means;

interpreter means for interpreting information contained within the received signals to identify touch patterns to said touch pad means, said interpreter means including means for identifying swiping touch patterns in the form of first letters of names of the devices, said interpreter means includes means for discriminating between the identified touch patterns in the form of the first letters; and signal means for providing control signals to control the controllable aspects of the devices in response to the identified touch patterns, said signal means including means for providing signals directed to the device whose name first letter has most recently been identified.

2. An apparatus as set forth in claim 1, wherein said interpreter means includes means for identifying touch patterns, subsequent to identifying a specific touch pattern in the form of a name first letter of a device, as being touch patterns that correspond to controllable aspects of the associated device, said signal means including means for providing signals to the associated device that convey commands associated with the subsequent touch patterns.

3. A method for controlling a plurality of controllable devices, said method comprising:

providing touch pad means having an array of manually touchable areas arranged such that various swiping and non-swiping manual touch patterns to the array can be accomplished;

performing touch patterns on the touch pad means including performing touch patterns in the form of alphanumeric characters and touch patterns that correspond to controllable aspects of the devices;

sending signals from the touch pad means indicative of manual touches to the areas of the array;

receiving the signals sent from the touch pad means;

interpreting information contained within the received signals to identify touch patterns to the touch pad means, including identifying swiping touch patterns in the form of first letters of names of the operable devices, and discriminating between the identified touch patterns in the form of the first letters; and providing control signals to control the controllable aspects of the devices in response to the identified touch patterns, including provided signals directed to the device whose name first letter has most recently been identified.

4. A method as set forth in claim 3, wherein said step of interpreting the received signals includes identifying touch patterns, subsequent to the identification of a specific touch pattern in the form of a name first letter of a device, as being touch patterns that correspond to controllable aspects of the associated device, said step of providing signals includes providing signals to the associated device that convey commands associated with the subsequent touch patterns.

* * * * *